J. YORKS.
BALL COCK.
APPLICATION FILED MAR. 22, 1921.

1,432,145. Patented Oct. 17, 1922.

Inventor:
Julius Yorks.
by his atty

Patented Oct. 17, 1922.

1,432,145

UNITED STATES PATENT OFFICE.

JULIUS YORKS, OF BOSTON, MASSACHUSETTS.

BALL COCK.

Application filed March 22, 1921. Serial No. 454,337.

*To all whom it may concern:*

Be it known that I, JULIUS YORKS, a citizen of the United States, residing at Boston, in the county of Suffolk and State of Massachusetts, have invented new and useful Improvements in Ball Cocks, of which the following is a specification.

This invention relates to improvements in ball cocks.

The object of the invention is to provide a ball cock with a self contained valve by means of which the flow of water therethrough may be stopped to permit of repairs within the valve chamber as, for example, the application of a new washer to the float actuated valve member which normally controls the passage of water through said cock, thereby eliminating the necessity of shutting off the water at the main stop cock or otherwise interrupting the flow of water to any other part of the water distributing system of which the ball cock may constitute a unit.

The invention consists in the combination and arrangement of parts set forth in the following specification and particularly pointed out in the claims.

Referring to the drawings.

Like numerals refer to like parts throughout the several views of the drawings.

Figure 1:
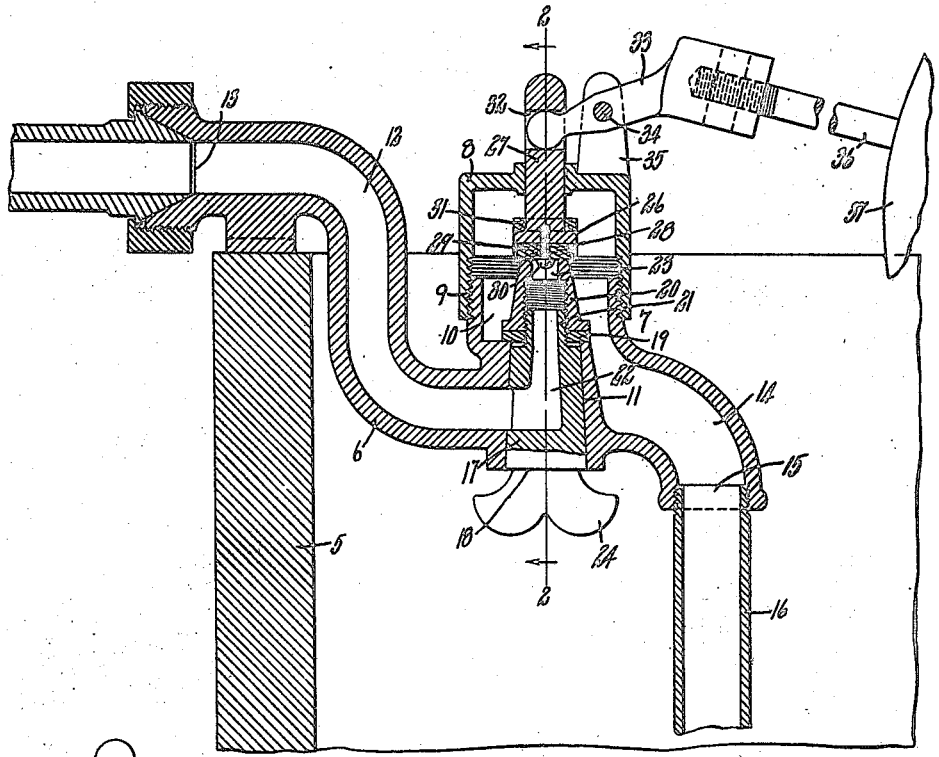
Figure 1 is a central, vertical, longitudinal section through the ball cock, the same being illustrated mounted upon a tank which is broken away to save space in the drawings.

In the drawings, 5 represents the wall of a flush tank upon the upper edge of which is mounted the main body portion 6 of a casing 7. The casing 7 is completed by providing a cap 8 which has screw-threaded engagement with the main body portion 6 at 9. The casing 7 has a valve chamber 10 located within the interior thereof and in the lower end of said valve chamber is formed a valve seat 11 which tapers from the lower end thereof inwardly. The main body portion 6 has a passage 12 formed therein which connects an inlet end 13 with the tapered valve seat 11 of the valve chamber 10 and constitutes an inlet passage, while a passage 14 also formed in the main body portion 6 and constituting a discharge passage, connects the valve chamber 10 with a discharge point 15 from which preferably extends a short length of pipe 16 which delivers the water to a point adjacent to the bottom of the tank.

Located in the tapered valve seat 11 is a tapered plug valve 17 which is inserted within said valve seat from the under side of the main body portion 6 through an exterior opening 18 and said valve tapers inwardly to correspond to the taper of the valve seat 11. The valve 17 is held in position within the valve seat 11 by a nut 19 and a lock nut 20 which have screw-threaded engagement with an extension 21 provided upon the inner end of said valve. A passage 22 is provided extending through the valve 17, the lower orifice thereof being adapted to align with the inlet passage 12 of the main body portion 6, and the lock nut 20 also has a passage 23 extending therethrough which aligns with the passage 22 of the valve 17. A thumb piece 24 projects from the lower end of the valve 17 and forms a convenient means for turning the valve.

Figure 2:
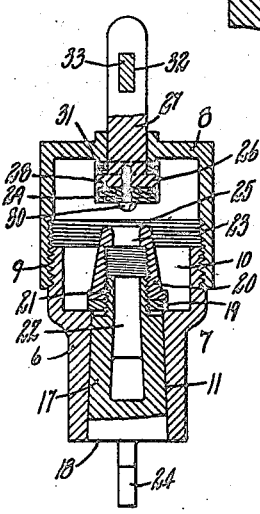
Fig. 2 is a vertical, transverse section taken on the line 2—2 of Fig. 1.

The lock nut 20 is preferably frusto-conical in shape and the upper extremity 25 thereof constitutes a seat for a valve 26 which is slidably mounted in the cap 8 having a valve stem 27 formed integral therewith which projects through said cap. The lower extremity of the valve 26 is provided with a recess 28 formed therein in which a suitable washer 29 is secured by a screw 30. When the valve 26 is in its lowered position, the washer 29 rests upon the seat 25 as illustrated in Figure 1. Another washer 31 is provided encircling the valve stem 27 within the valve chamber 10 and when said valve is in its extreme raised position, said washer contacts with the undersurface of the cap 8 as illustrated in Figure 2. The upper end of the valve stem 27 is provided with a slot 32 into which projects the end of a lever 33 pivoted at 34 between a pair of arms 35 formed integral with the cap 8. A float arm 36 is secured in the lever 33 in any suitable manner and at the outer end of said float arm a float 37 of the usual well known construction is located.

The general operation of my improved ball cock is as follows:—When the flush tank 5 is filled with water to a predetermined high level, the float actuated valve 26 is in its lowered position and seated upon the valve seat 25, thereby preventing water from entering the valve chamber 10 through the passages 12, 22 and 23. When, however, the water within the tank has been drawn therefrom in a manner well known to those skilled in the art, the float 37 drops as the level of the water falls. This raises the valve 26 and allows the passage of water into the valve chamber 10 from which it passes through the passage 14 and pipe 16 into the tank 5. If it is necessary for any reason to remove the cap 8 from the main body portion 6, as, for example, to replace an old washer 29 with a new washer, the tapered valve 17 may be turned sufficiently to cut off the flow of water from the passage 12 of the main body portion 6 into the passage 22 of the valve 17. The cap 8 may then be removed and the repairs made without the necessity of shutting off the main stop cock and thereby interfering with the flow of water to other units located in the water distributing system.

I claim:

1. In combination, a casing provided with a valve chamber therein having inlet and discharge passages communicating therewith and a tapered valve seat also formed therein and located between said inlet and discharge passages, a tapered rotatable valve member located within said tapered valve seat, means located within said valve chamber adapted to hold said tapered valve member within said tapered valve seat, said means also constituting a valve seat, a movable valve member adapted to engage said last-named valve seat and means to impart a reciprocatory motion to said movable valve member.

2. In combination, a casing provided with a valve chamber therein having inlet and discharge passages communicating therewith and an inwardly tapering valve seat also formed therein and located between said inlet and discharge passages, a tapered rotatable valve member located within said tapered valve seat, means located within said valve chamber adapted to hold said tapered valve member within said tapered valve seat, said means being provided with a liquid passage extending therethrough and also constituting a valve seat, a movable valve member adapted to engage said last-named valve seat and means to impart a reciprocatory motion to said movable valve member.

3. In combination, a casing provided with a valve chamber therein having inlet and discharge passages communicating therewith and an inwardly tapering valve seat also formed therein and located between said inlet and discharge passages, a tapered rotatable valve member located within said tapered valve seat, a nut and a lock nut located within said valve chamber and having screw-threaded engagement with said tapered valve member and adapted to hold said tapered valve member within said tapered valve seat, said lock nut constituting a valve seat and being provided with a liquid passage extending therethrough, a movable valve member adapted to engage said last-named valve seat and a float operatively connected with said movable valve member and adapted to impart a reciprocatory motion thereto.

In testimony whereof I have hereunto set my hand in presence of two subscribing witnesses.

JULIUS YORKS.

Witnesses:
FRANKLIN E. LOW,
HAZEL F. LA MUDGE.